United States Patent

McHenry et al.

[11] Patent Number: 5,770,290
[45] Date of Patent: Jun. 23, 1998

[54] EASY OPEN END OF A METAL-PLASTIC CONSTRUCTION

[76] Inventors: Robert J. McHenry, 2819 Royal Ashdown Ct., St. Charles, Ill. 60174; Dominique Petit, Les Cotes F-38340, Pommiers-la-Placette, France

[21] Appl. No.: 656,344
[22] PCT Filed: Nov. 30, 1994
[86] PCT No.: PCT/US94/13919
   § 371 Date: Sep. 3, 1996
   § 102(e) Date: Sep. 3, 1996
[87] PCT Pub. No.: WO95/15228
   PCT Pub. Date: Jun. 8, 1995

[30] Foreign Application Priority Data
   Dec. 1, 1993 [FR] France .................................. 93 14616

[51] Int. Cl.$^6$ ........................... B65D 17/28; B65D 75/62; B32B 3/30
[52] U.S. Cl. ........................... 428/43; 428/131; 428/137; 428/132; 428/35.9; 428/213; 428/214; 428/215; 428/457; 428/458; 428/461; 220/266; 220/267; 220/268; 220/269; 220/270; 220/276; 215/253; 215/256; 413/15; 413/12; 413/17
[58] Field of Search .............................. 428/43, 131, 137, 428/132, 35.9, 213, 214, 215, 457, 458, 461; 220/266, 267, 268, 269, 270, 276; 215/253, 256; 413/15, 12, 17; 493/160

[56] References Cited

U.S. PATENT DOCUMENTS 4,126,244 11/1978 Elser ........................................ 220/268
4,313,996 2/1982 Newman et al. ........................ 428/215
4,504,181 3/1985 Khoury ..................................... 413/17

FOREIGN PATENT DOCUMENTS

WO 91/18795 12/1991 WIPO .

*Primary Examiner*—William Watkins
*Attorney, Agent, or Firm*—Hill, Steadman & Simpson

[57] ABSTRACT

An easy open end for food and beverage cans having reduced aluminum content is provided in an end having a metal polymer metal laminate construction. An opening panel as defined in the end body by a pair of first and second spaced apart score lines disposed in the first and second major surfaces, respectively. Each of the first and second score lines define an area of reduced thickness for both the metal layer and the adjacent polymer layer. The opening panel can be displaced from the remainder of the end body to provide an easy opening can by perforating the end body at a point along the first and second score lines.

22 Claims, 3 Drawing Sheets

EASY OPEN END OF A METAL-PLASTIC CONSTRUCTION

BACKGROUND OF THE INVENTION

The invention belongs to the technical area of the application of layered metal-plastic material construction to packaging and more precisely to the fabrication of easy open ends used for closing containers containing food or beverage products.

More precisely still, the metal-plastic construction applied is of the type metal-polymer-metal, that is in which a foil of polymer is surrounded by two metal foils to which it is adhered.

In the text of the present patent application, we will use, without distinction for these constructions, the terms metal-plastic-metal, metal-polymer-metal, or more simply in an abbreviated fashion, MPM.

1. Problem Posed

Easy-open ends for food or beverage cans are generally constituted of a metal foil covered on the inside of the can by a protective varnish avoiding contact of the foods or of the beverage with the metal of the end and preserving the cover from corrosion and the contents from contaminations.

These easy open ends possess a system of perforation and a tearing line. The system of perforation is constituted most frequently by a ring connected to a punch. When one pulls on the ring to move it from a position parallel to the end to a position perpendicular to the end, the punch perforates the cover at a place located on the line of weakness corresponding to which the tearing continues when one continues to pull on the ring. The line of weakness or of tearing can have various designs according to whether one wishes to achieve an opening in the form of a pour panel (the case of the beverage can) or a full panel opening of the can (the case of food cans).

In both cases, the line of weakness or tearing is obtained by scoring the outside or the inside face of the end. It is not unusual in fact, notably for steel food can ends to score the internal face and later repair the damaged internal varnish layer. This method presents two advantages: the first is that it is easier to achieve in this manner the balance between ease of opening and the resistance to accidental opening; the second is that even with an outside score, the deformation of the metal induces small cracks in the internal varnish. But these small cracks are practically impossible to repair whereas the larger notches resulting from the internal scoring can be easily repaired by electrophoresis. The weakening in both cases is caused by the smaller quantity of metal present under the base of the score, as this is shown in cross-section in FIG. 1 where (1) designates the metal, (2) the external incision, and (3) the layer of inside varnish.

The problem posed initially to the inventors was that of improving the beverage can. Of a capacity in general of 33 centiliters, of a cylindrical shape, this can is closed by an easy open end, coated internally by a food approved varnish and externally by one or several layers of decoration indicating the nature and the brand of the contents. These coatings are in general applied after the forming of the can.

Among the elements of cost of the beverage can, the cost of the metal, despite its slight weight, constitutes a preponderant portion. The idea had therefore occurred to the researchers of replacing a part of the metal by a less costly material: plastic.

The inventors have found a solution to this problem consisting of a metal-plastic construction composed on a foil of thermoplastic polymer coated on each of its faces with a metal foil with an intermediate adhesive layer. They have then asked themselves if such a metal-plastic construction would not also be able to replace the metal sheet used for the preparation of the ends. Aside from the economic advantages, this solution would facilitate the recycling of the ends which would be made starting from a product identical to or similar to that of the metal-plastic cans of a similar type of MPM structure.

But even with the conventional easy open ends having a thin protective organic coating, it is difficult to arrive at an acceptable balance of easy opening and the protection against an accidental opening during transportation and storage. If the scoring of the metal is not deep enough, the opening is too difficult, if it is too deep, the resistance to accidental opening is insufficient.

The achievement of this balance is particularly difficult because the difference in residual thickness between an end which opens too easily and an end which opens too difficultly is so slight that the normal tolerances of the tooling or their normal wear can perturb the desired balance.

This demand for precision of the residual thickness of metal is still more difficult to satisfy if one tries to score an MPM end with known tooling for traditional ends. If one scores the outside of the end, it is necessary that the score completely penetrate the outside metal layer and make a notch in the internal layer deep enough to create stress concentrations sufficient for tearing the metal. As each metal layer is significantly thinner than with a conventional end, the balance between the ease of opening and the resistance to accidental opening is still more difficult to attain.

The simultaneous or successive scoring of both metal layers from the outside and inside at the same location does not completely resolve the problem of leaving a determined thickness of residual metal in the metal layers.

Some attempts have been made to avoid this need for precision of the residual thickness in the case of all-metal ends by using two scores which are laterally displaced in the plane of the end. Because of the high strength of the alloys used in metal ends, these scores must be spaced with only a small lateral distance between scores. Not only does this still require a high degree of precision, but there is a danger of cracks propagating from one score to the other very proximate score during the scoring process or during shipment and handling.

With paperboard covers for other types of containers, such double scores have been more successful. This success can be attributed to the east with which paper tears. This ease of tearing allows the scores to be placed farther apart.

On the contrary, plastics are notoriously difficult to tear because of their ability to undergo plastic deformation rather than to propagate a crack or a tear.

Even when a very thin film of plastic is adhered to a thick metal foil, the plastic does not tear cleanly. For example, when the interior varnish of conventional metal ends is replaced by a plastic film, the latter deforms to a great extent at the moment of tearing, generating a fault designated as "feathering." This feathering is a result of plastic deformation and is characterized in that the cut across the plastic, instead of being clean and straight, is irregular and stretched such as shown in FIGS. 2a and 2b. FIG. 2a represents the score line in the metal (5) and the layer of plastic material (6) before tearing. FIG. 2b represents with the same numerical designation the three elements after tearing. One sees the tapered or feathered shape of the tear in the plastic material.

Since the preferred plastic thickness in a metal-plastic-metal can end is several times that of a plastic film which serves only to protect a metal can end from corrosion, the tear resistance of plastic would be expected to be even more of a problem for metal-plastic-metal ends.

2. Description of the Prior Art

The French patent application, published Mar. 13, 1992, under U.S. Pat. No. 2,666,564 in the name of GIE Pechiney Recherche, brings a solution to the problem of feathering when a plastic film replaces the varnish on a conventional metal end. This solution consists of an easy open can end of a metal foil and plastic film which encompasses, in addition to the mechanical score of the outside face of the metal foil, a continuous depression of the plastic film on the inside at the line of the mechanical scoring. This continuous depression is obtained by a concentrated source of heat, for example a laser beam.

However, this solution would not be applicable to the metal-plastic constructions developed in the present invention since the layer of plastic material is sandwiched between two metal foils.

Single scores in metal can ends are well known in the prior art. For example, U.S. Pat. No. 3,990,376 (J. R. Schubert) describes a single score end in which the resulting sharp edge of the removed panel is protected by folded metal in such a way that the protecting folded metal does not interfere with the opening of the end.

Double scores which are laterally displaced have also been described in NL-A-8900863 (assigned to Hoogovens Groep), in U.S. Pat. No. 4,126,244 (W. F. Elser) and in U.S. Pat. No. 4,129,085 (G. B. Klein). NL-A-8900863 states that the residual metal thickness between the two score amounts to 20 percent of the original end thickness. U.S. Pat. No. 4,126,244 also describes two very proximate scores in stating that in order to reliably provide a predefined, selectively weaker path of fracture in the wall section, the interspacial distance between the channels should be substantially less than the basic average thickness of the wall section. Although U.S. Pat. No. 4,129,085 does not state a particular lateral distance between the scores, the drawings show them to be very close, in fact overlapping, to such an extent that only a thin section of metal is left between the two scores. The scores are described as being so close that if the two scores are made sequentially, metal will be pushed into the first score when the second score is subsequently cut.

In U.S. Pat. No. 4,564,119 (assigned to Nippon Light Metal KK), the inventors show two scores which are laterally more distant from each other in an all-metal end. In this case, one of the scores is an auxiliary having the score residual greater than that of the severing score in order to afford an appropriate deformation of the can end. Since this auxiliary score is designed not to fracture, this invention falls within the general area of single score ends in terms of the actual mode of fracture.

Double score paperboard covers for other types of packages have been described in U.S. Pat. No. 3,185,578 (E. W. Scharre) and FR-A-1279093 (F. C. Mennen). U.S. Pat. No. 3,185,578 in particular shows a paperboard cover in which one portion of the cover can be removed before another portion in order to provide selective heating of different types of food. The paperboard of the cover is preferably coated on both sides by moisture resistant materials, one of which may advantageously be aluminum foil. Paperboard being easy to tear, the purpose of the offset scores which penetrate through the moisture barrier layers is to prevent wicking of moisture through the cover and to preclude penetration of foreign matter into the container. FR-A-1279093 describes a popcorn container consisting of an aluminum tray, an expandable aluminum foil cover, and a rigid paperboard cover which protects the expandable foil cover. In at least one of the embodiments of this invention, the tearing of the paperboard cover is controlled by a double score.

The PCT application WO91/18795, published Dec. 12, 1991 in the name of American National Can Company, describes an easy opening means applied to the wall of a plastic container consisting of notching the inside and outside faces of the wall and creating a zone of weakness in the interior of this wall. As indicated by FIG. 1A of that application, the outside face encompasses two notches situated at different heights of the container and the inside face, one notch, situated at an intermediate height.

That application however, appears to be far removed from the present invention: first, it does not involve ends but the upper part of the wall of a container; furthermore, it involves plastic containers and not metal-plastic; finally, it uses three notches, two exterior and one interior and the part of the walls included between the two exterior notches is detached from the container at the moment of opening.

None of the above prior art describes a double scored metal-plastic-metal end with its peculiar problem of propagating a tear through a tear resistant plastic core.

Metal-plastic-metal structures per se are described in EP-A-0019835 (Dow Chemical Company), EP-A-0046444 (Schweizerische Aluminum), EP-A-0034781 (BASF Aktiengesellschaft), WO-A-8200020 (Metal Box Limited), and EP-A-0115103 (Sumitomo Chemical Company). These patents describe metal-plastic-metal sheets, processes for making these sheets, or processes for converting the sheets into various articles. None of these inventions describes ends, whether easy open or standard, nor any other type of rupture or tearing of such structures.

3. Object of the Invention

The invention has for object an easy open end fabricated from a metal-plastic construction of the type metal-plastic-metal, or in abbreviated form MPM, of which the line of weakness or of tearing is accomplished in a particular manner: it involves two scores made in the metal foils of the construction and satisfying particular geometric conditions.

DETAILED DESCRIPTION OF THE INVENTION

The invention concerns an easy open end provided with a tear line in a metal-plastic construction of the type metalpolymer-metal intended for the closing of food or beverage cans characterized in that the tear line is formed of two neighboring scores in which one is in the metal foil on the outside of the end, the other in the metal foil on the inside of the end.

Figure 1:
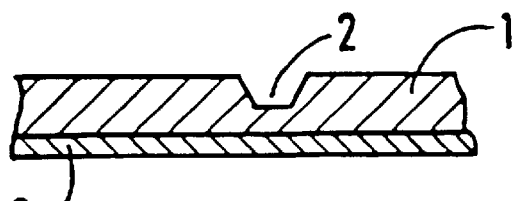
FIG. 1 represents in cross section a tear line of the prior art on ends varnished interiorly.
Figure 2:
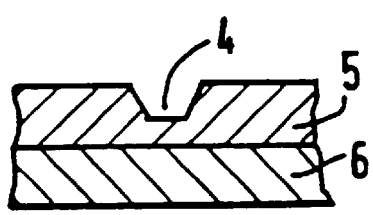
FIGS. 2a and 2b represent the mode of tearing of a simple metal-plastic construction with one layer of metal and one layer of plastic.
Figure 2:
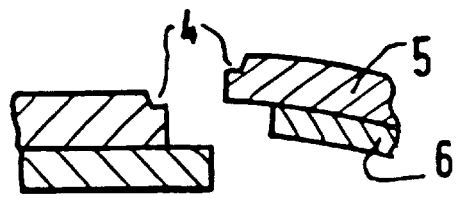
Figure 3:
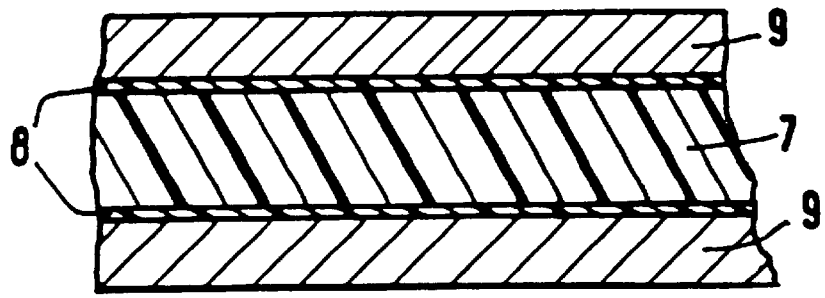
FIG. 3a represents in cross section a metal plastic MPM construction utilized in the invention.
FIG. 3b represents in cross section a tear line according to the invention.
Figure 3:
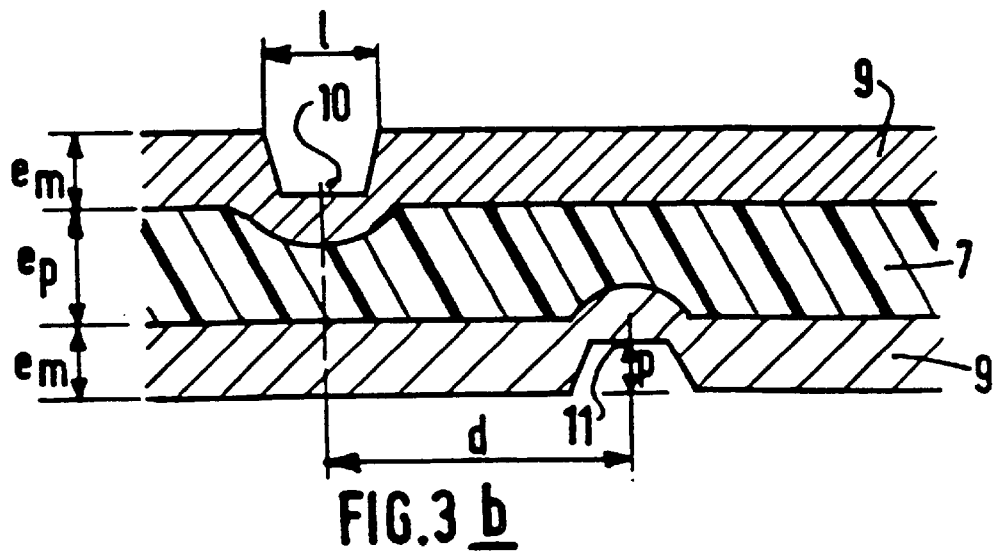

The invention is illustrated in FIGS. 3a and 3b. FIG. 3a represents in cross section the metal-plastic construction used in the development of the invention. This construction includes a central layer of thermoplastic polymer (7) on each face of which is adhered a metal foil (9). A thin layer of adhesive can be interposed between polymer and metal.

FIG. 3b represents a cross section in a plane perpendicular to the double scoring, after realization of this double scoring by the classical technique of stamping. The polymer and the metal are still designated by the marking (7) and (9) while for reasons of clarity of the drawing, the adhesive layer is not shown. The scores in the metal foils are designated by (10) and (11). One observes on the drawing that, at the score line, not only the thickness of the metal but also that of the plastic has been reduced.

Despite the relatively high initial thickness of the plastic and the fact that the score itself does not penetrate into the plastic core, the end of this invention opens easily and cleanly. This is particularly surprising given the previously described problem with feathering with a much thinner layer of plastic adhering to a single layer of metal. Although this clean tearing might be partially attributed to the surprising decrease in plastic thickness directly under the score, the relative thickness of this residual plastic is still greater than that of the plastic film with which feathering was observed.

Although the explanation for this enhanced tearing is not completely understood, it is apparently related to the fact that the plastic is trapped between two relatively rigid metal layers. When a free film of a material such as a plastic is stretched in one direction, its plastic deformation in that direction is accompanied by a contraction in the other planar direction and by a reduction in its thickness. Because the plastic core layer in the metal-plastic-metal end of this invention is restricted by the two metal layers from contracting in these two directions, it acts like a stronger but stiffer material. This added stiffness apparently concentrates the stress discontinuities within the plastic which are generated by the rupturing of the metal score to a large enough extent to overcome the added strength; thereby resulting in a clean and easy tear.

Even if there remains a thickness of residual metal in the two metallic layers, the force required for opening is not determined only by this thickness of the residual metal. This force depends jointly on the thickness of the residual metal, on the distance between the two incisions, or else on the shear strength of the plastic core, or else on the shear strength of the adhesive between the plastic core and each metal layer, or else on the adherence of the adhesive on each metal layer. But, the distance between the two scores is much easier to control and to maintain constant than the thickness of the residual metal because it is significantly greater than the thickness of the residual metal and, therefore, less sensitive to normal tolerance of tool wear. It is also less sensitive to wear, first because it is larger, but also because its direction is perpendicular to that of the tool displacement and, therefore, to the variation of dimension resulting from the repeated impact of this tool.

If the thickness of the residual metal is slight, the opening force will be determined essentially by the easy to control distance between the two incisions and to a lesser degree by the residual metal. In fact, even if one of the layers was completely sheared, a balance between the resistance to the accidental opening and ease of opening can be found.

Furthermore, the inventors have found that the thickness of residual metal was not as sensitive to slight variations in the tooling as in the case of an entirely metal end in reason of the capacity of the plastic to undergo deformation in the zone of the incision.

The geometry of this double incision should preferable meet certain criteria depending on the thickness of the metal of that of the plastic. If one calls;

$e_m$ the metal thickness $e_p$ the plastic thickness p the depth of incision d the distance between the center lines of the scores l the width of the score at its exterior dimension, the following relationships should preferably be respected:

$$2e_m 3 < p < e_m + e_p,$$

$$100 \; \mu m < d < 1000 \; \mu m, \text{ and}$$

$$P/2 < l < 2p.$$

The relative positioning of the incisions on the inner side of the end and on the outer side should be adapted according to the type of end.

Figure 4:
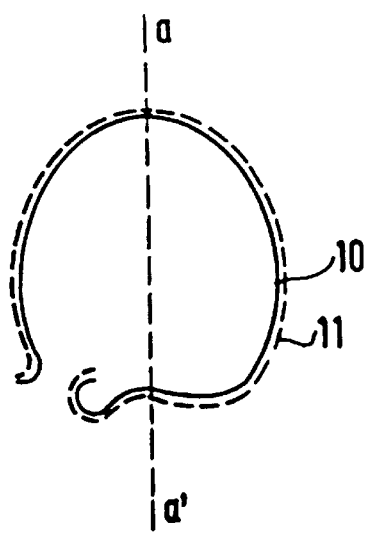
FIGS. 4a and 4b represent a beverage can end in which the opening panel displaces only in the direction toward the interior of the can and remains attached to the end after opening.
Figure 4:
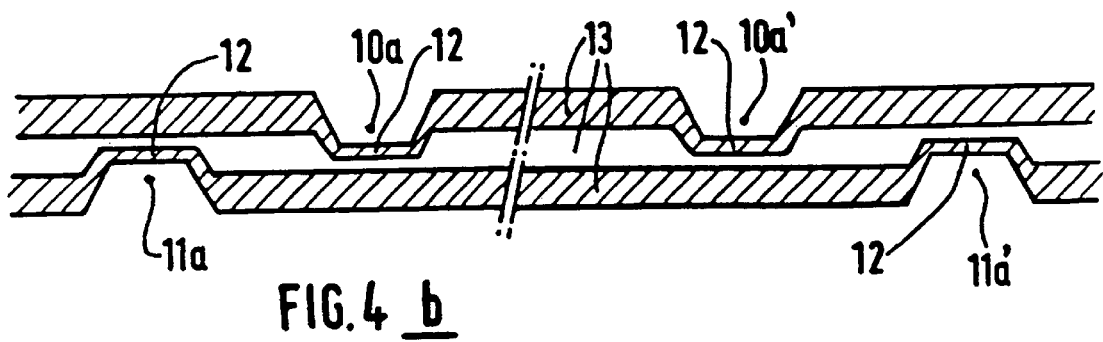

A first relative positioning, FIG. 4, corresponds to beverage can ends in which the opening panel is displaced in a single direction towards the interior of the can and remains attached to the end after opening. FIG. 4a shows the opening panel as seen from above. In this mode of realization, the periphery of the external score (10) ought to be entirely interior to that of the internal score (11) in a fashion that the panel can completely span the orifice. FIG. 4b shows an interrupted cut of the end, and of the opening panel along aa' with two external scores (10a) and (10a') and two internal scores (11a) and (11a'). The rupture occurs at the points marked (12) and it is clear that the central panel can easily span the opening.

Another application of this first positioning is a conventional end opening with a can opener which exerts a vertical downward shear force successively on all the perimeters of the end.

Figure 5:
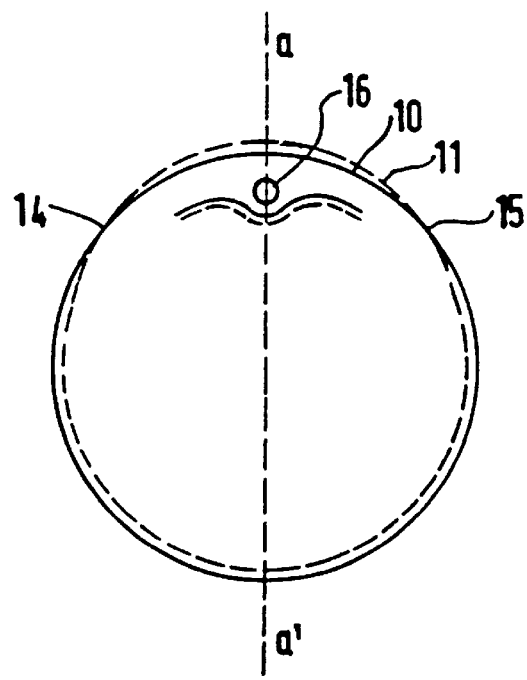
FIGS. 5a and 5b represent an end of a food can in which the opening panel is first pushed toward the interior of the can at the moment of the initial perforation, then detached by pulling toward the exterior of the can.
Figure 5:
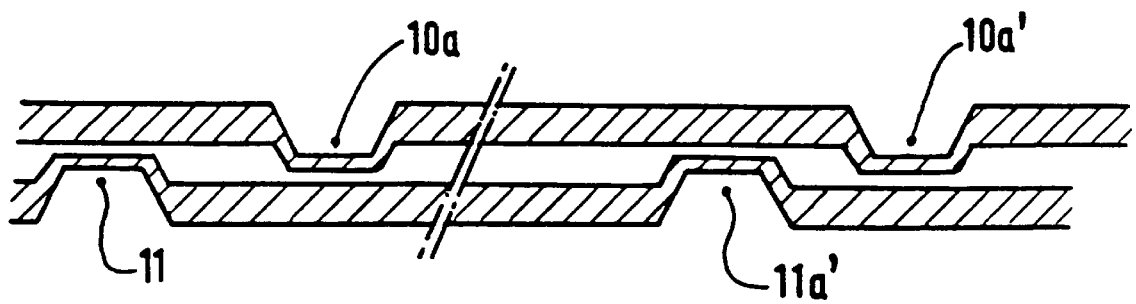

A second positioning, FIG. 5, corresponds to ends, for example food cans, in which the opening panel if first pushed towards the inside of the can at the moment of the initial perforation, then detached by pulling towards the outside of the can. FIG. 5a shows the opening panel viewed from above. In this method of realization, the periphery of the external score (10) should be interior to that of the internal score (11) in that part near to the perforation, then exterior, aside from this part. The two score lines, interior and exterior, cross of each other at two points (14) and (15). The rivet (16) serves to attached the ring. FIG. 5b represents an interrupted cut of the end and of the opening panel along aa' with the two external scores (10a) and (10a') and the two internal scores (11a) and (11a').

A third positioning according to the invention is that of an end in which the opening panel is displaced in a single direction towards the exterior of the can and detaches itself completely from the cover after opening. In this mode of realization, the perimeter of the external score ought to be completely exterior to that of the internal score. Although such a panel externally lifted had been at one time the norm for beverage can ends, it has still been difficult to achieve for full panel opening ends for food cans by reason of the large force for initiating the tearing of the score. But with this invention, however, the initial opening force can be easily controlled by the method of deep scoring of the two metal layers combined with a reduction of the distance between the two scores in the region of the end where opening commences.

Aside from the economic advantages and an improved adjustment of the opening force, the invention presents other advantages. The first is that the corrosion on one or even both metal layers to the point of perforation does not involve leaking or contamination of the product by outside organisms. In the case where both metal layers would be perforated, there could, of course, occur passage of gas between the product and the external environment, since the plastic core is not an absolute barrier to the gas. As the area of these perforations is small, the passage of gas will be also very small. In addition, the path of gas passage across the plastic will be very long, at least unless the perforations in the two metal layers are exactly one above the other. But, as most perforations occur along the score lines and as, according to the invention, these lines re staggered, the passage of gas will be very slight.

In addition, with such MPM ends, one can choose the alloys to limit corrosion. For example, the alloy used for the internal layer can be chosen to minimize corrosion in the presence of a particular food and the alloy chosen for the outside layer can be chosen for its mechanical strength or its resistance to corrosion in contact with a given environment.

Another advantage of the invention appears in the case of ends for pressurized products such as gaseous beverages. This advantage lies in the fact that the force exerted when one opens the container is directed from the outside to the inside, whereas the principal force for accidental opening is directed from the inside towards the outside. The positioning of the score in the internal layer laterally to the exterior of the score in the external layer furnishes a supplementary protection against accidental opening provoked by the internal pressure, since it is impossible for the internal layer to pass through the smaller opening in the external layer.

A common problem with can ends is to prevent the sharp edges of the removed cover and of the metal resting on the can from causing wounds. This problem is perhaps even more acute with MPM ends. The shear of the plastic core could, in effect, occur in two different fashions:

(a) If the shear resistance of the interface is less than the internal shear resistance of the plastic, one observes a delamination of the core from one of the metal layers. This thin unglued metal layer then presents an edge particularly sharp. In this case, the can can be designed in a fashion to protect this sharp edge by an adjacent part of the can. An example of such protection consists in that the wall of the can body presents a shape such that the opening is above a shoulder of the can, preventing the user's fingers from coming in contact with the sharp residual metal. With such a model, the shear should occur adjacent to the protected edge in a fashion that the other edge (for example, the edge of the removed panel) be protected by the full thickness of the plastic core. This selective rupture of the adhesion can be accomplished simply by the utilization of a less adherent adhesive on the surface where one wishes that the tear occur.

(b) If the shear resistance of the interface is greater than the internal shear strength of the plastic, one then observes a shear within the plastic core which leaves the edges coated with a relatively thick layer of plastic and thus prevent wounds.

To direct this shear, either to the interface with the metal or to within the plastic core, one utilizes a layer of polymer of weak cohesion in which the rupture propagates. This layer can be one of the adhesive layers, the polymer core proper, or a supplementary layer which can be situated, for example, with the plastic core. The advantage of using such a layer rests in the fact that the rupture can be controlled by the mastery of the cohesion of the material used. The choice of the material of weak cohesion should be, of course, made as a function of its compatibility with the other materials used in the structure. It is known that the addition of non-reinforcing fillers to the polymer allows a reduction of mechanical properties and, in particular, its properties of resisting rupture, therefore of diminishing its cohesion. The concentration of the non-reinforcing filler assures the control of the cohesion of the material in question.

Fillers presenting clivage planes only slightly adherent in the same way as some minerals, such as mica, can thus diminish the cohesion of polymers.

Another possibility consists in using two layers of polymers of weak compatibility of the sort where the rupture occurs at the interface between the two layers. The two layers can be coextruded or applied with the usual techniques of induction. The degree of compatibility between the two materials used permits the mastery of the adhesive rupture which occurs upon the opening of the end.

Preferably, the metal-plastic construction presents certain characteristics of thickness and of composition.

The thickness of the different constituents of the construction will advantageously conform to the following specifications: (in microns)

| | |
|---|---|
| Metal | 25 to 100 |
| Adhesive | 0 to 10 |
| Polymer | 80 to 300 |
| Adhesive | 0 to 10 |
| Metal | 25 to 100 |

In that which concerns the composition of the constituents:

The polymer constituting the cores is chosen among one of the following thermoplastic polymers: polypropylene, high and low density polyethylene, polyesters, polyamides. It is interesting to note that, the polymer not being in contact with the food product or beverage contained in the container, it is possible to use recycled polymers. Trials have been made on the recycled polyester and polypropylenes and give completely satisfactory results.

The adhesive, preferably interposed between the polymer and the metal, is either a thermosetting polymer, for example of the type polyurethane or epoxy, or a thermoplastic polymer, such as polyolefins modified in the classical fashion by a ethylenic acid (maleic, crotonic, etc.), ethylene-acrylic polymers, polyesters, or different copolymers of the monomers corresponding to the polymers indicated above.

The metal is either of steel, tin plated or not, coated with chrome, with zinc, with nickel, or with chrome-chrome oxide, of aluminum or an alloy of aluminum. An aluminum alloy, preferably in a hardened state, is preferably used.

The metal-plastic construction objects of the invention are prepared by different known methods. The most commonly used are direct co-extrusion, heat sealing, and induction gluing. These last two methods are preferably practiced on a continuous line fed with plastic films and metal strips.

Direct co-extrusion consists of extruding between the two metal foils which unroll continuously and which constitute the external layers, the central polymer layer and on one side and the other of this central layer the two thin layers of adhesive. The composite product thus obtained passes then between the rollers in order to achieve the adherence between the different layers. This technique evidently applies just in the case of thermoplastic adhesives.

Heat sealing consists in starting with a composite strip of polymers including a central layer of polymer coated on each of its faces by the adhesive layer, here also thermoplastic, and of introducing this strip between two metal foils. The heat bonding is assured by the passage of the composite product thus obtained between two rolls heated to a temperature sufficient to melt or at least soften sufficiently the adhesive layer in a fashion to guarantee the adhesion between the polymer core and the metal foils.

Finally, the gluing by induction consists of coating the inside faces of the two metal foils with a thermosetting adhesive by a known method and of applying these foils from one side and the other or the strip of central polymer with the aid of rollers.

The fabrication of the ends according to the invention is done by drawing in utilizing the usual techniques. The two score lines can be made simultaneously or successively.

The ends which are the object of the invention can be attached to all types of cans, beverage cans, food cans, by all types of means of attachment: seaming, gluing, heat sealing.

EXAMPLES

Example 1:

A strip of polypropylene of 140 microns in thickness has been coated on each of its faces with a layer 5 microns thick of adhesive constituted by a film of maleic acid modified polypropylene. The two films of adhesive have been applied on the polypropylene film by cold passage between the rolls. The composite strip thus obtained has then been continuously introduced between two foils of 80 micron thick of aluminum alloy 3003, a manganese alloy according to the "Aluminum Association" standards, each unwound starting from a bobbin and preheated by passage in an oven at a temperature of 200° C. in a fashion to melt the adhesive. The MPM composition obtained was then passed between rolls exerting a pressure around 400 $kP_a$, then rolled onto a bobbin. Starting from this construction, circular discs of 75.4 mm diameter were cut. These discs have then been drawn for giving ends of 65 mm and provided with an external tear line (shown as solid line) and an internal tear line (shown as dotted line) forming the shape represented in FIG. 4. These ends have then undergone an examination which has not evidenced any cracks in the metal or the plastic. No delamination between the metal and the plastic has been observed. In addition, the tearing of the scored lines was achieved in a perfect fashion without the phenomenon of feathering.

Example 2:

A layer of low density polyethylene of 150 microns in thickness has been extruded between two foils of 80 microns thickness of aluminum, each unwound from a bobbin and preheated by passage in an oven at a temperature of 200° C. without interposition of adhesive. The MPM construction obtained was then passed between rollers exerting a pressure around 4000 $kP_a$, then rolled onto a bobbin. Starting from this construction, circular discs 94 mm in diameter were cut. These discs have been then drawn to give ends of 81 mm in diameter and provided with an external tear line (shown in solid line) and an internal tear line (shown in dotted line) assuming the shape represented in FIG. 4. These ends have then undergone the same examination as those of Example 1 and resulted in the same observations.

We claim:

1. An easy open can end comprising:
a drawn end body having a generally circular configuration including a first major surface adapted to be inwardly facing and an opposed second major surface adapted to be outwardly facing when the can end is joined to a can body, said end body having an $M_i$-P-$M_e$ type laminar construction wherein $M_i$ and $M_e$ are inner and outer metal foil layers, respectively, each metal foil layer having a thickness of from about 25 to about 100 microns, and P is a central polymer layer, having a thickness of from about 80 to about 300 microns, said end body further including an opening panel defined by a first score line disposed in said first major surface, and a second score line disposed in said second major surface, wherein the first score line defines an area of reduced thickness for the metal layer $M_i$ and polymer layer P and the second score line defines an area of reduced thickness for the metal layer $M_e$ and the polymer layer P, and wherein the centerline spacing, d, between the first score line and the second score line is greater than about 100 $\mu$m, said opening panel being movable to define an opening in said end body by perforating the end body at a point along said first and second score lines and, thereafter, tearing the end body along the first and second score lines by displacing at least a portion of the opening panel from a remainder of said end body to define said opening.

2. An easy open can end as defined in claim 1, wherein the centerline spacing, d, between the first score line and the second score line is from about 100 $\mu$m to about 1000 $\mu$m.

3. An easy open can end as defined in claim 1, wherein said first and second score lines each have a configuration including a depth dimension, p, and a width dimension, l, taken at an outer facing surface of the respective metal layer such that $2/3\ e_m < p < e_m + e_p$, wherein $e_m$ is the metal layer thickness and $e_p$ is the polymer layer thickness; and $1/2\ p < l < 2p$.

4. An easy open can end as defined in claim 1, wherein said metal foil layers $M_i$ and $M_e$ are selected from the group consisting of aluminum, aluminum alloys, steel, tin-plated steel and chrome coated steel.

5. An easy open can end as defined in claim 1, wherein said polymer layer P is selected from the group consisting of polypropylene, low density polyethylene, high density polyethylene, polyester and polyamide.

6. An easy open can end as defined in claim 1, further comprising an adhesive layer in said laminate disposed between said polymer layer P and each of the metal foil layers $M_i$ and $M_e$.

7. An easy open can end as defined in claim 6, wherein said adhesive layers have a thickness of up to about 10 $\mu$m.

8. An easy open can end as defined in claim 1, wherein metal foil layers $M_{i\ and\ Me}$ are of the same material.

9. An easy open can end as defined in claim 1, wherein metal foil layers $M_i$ and $M_e$ are of different materials.

10. An easy open can end as defined in claim 1, wherein the shear strength of polymer layer P is less than the shear strength of each $M_i$-P and $M_e$-P interface such that on opening, tearing occurs within polymer layer P.

11. An easy open can end as defined in claim 1, wherein the shear strength of polymer layer P is greater than the shear strength of each $M_i$-P and $M_e$P interface, such that on opening, tearing occurs at the $M_i$-P and $M_e$-P interfaces.

12. An easy open can end as defined in claim 1, wherein polymer layer P is a unitary polymer layer.

13. An easy open can end as defined in claim 1, wherein said polymer layer P comprises a non-reinforcing filler.

14. An easy open can end as defined in claim 1, wherein said polymer layer P comprises a plurality of polymer layers.

15. An easy open can end as defined in claim 14, wherein polymer layer P comprises two different polymer layers of low compatibility.

16. An easy open can end as defined in claim 14, wherein one of said polymer layers in P has low cohesion to reduce the shear strength of polymer layer P and facilitate tearing.

17. An easy open can end as defined in claim 1, wherein said first and second score lines each have a generally 3-sided wedge-shaped configuration.

18. An easy open can end as defined in claim 1, wherein said first score line is disposed inwardly from said second score line.

19. An easy open can end as defined in claim 1, wherein said first score line is disposed outwardly from said second score line.

20. An easy open can end as defined in claim 1, wherein a first portion of said second score line is disposed inwardly from said first score line and a second portion of said second score line is disposed outwardly from said first score line.

21. An easy open can end as defined in claim 1, further comprising means connected to said opening panel to facilitate perforation and displacement of the opening panel to define said opening.

22. An easy open can end as defined in claim 1, wherein the distance, d, between the centerlines of the first and second score lines is reduced at a point where perforation upon opening is intended to occur.

* * * * *